United States Patent [19]

Lu

[11] Patent Number: 5,420,494

[45] Date of Patent: May 30, 1995

[54] BATTERY CHARGER DEVICE

[76] Inventor: Chao-Cheng Lu, 4-4, Alley 27, Lane 143, Chun Kung Road, Taipei, Taiwan, Prov. of China

[21] Appl. No.: 188,820

[22] Filed: Jan. 31, 1994

[51] Int. Cl.⁶ .............................................. H02J 7/04
[52] U.S. Cl. .......................................... 320/21; 320/39
[58] Field of Search ........................ 320/21, 31, 32, 33, 320/39, 40, 57, 59

[56] References Cited

U.S. PATENT DOCUMENTS

| | | | |
|---|---|---|---|
| 3,867,681 | 2/1975 | Bishop et al. | 320/21 |
| 3,927,361 | 12/1975 | Macharg | 320/39 |
| 4,321,523 | 3/1982 | Hammel | 320/21 X |
| 4,389,608 | 6/1983 | Dahl et al. | 320/33 |
| 4,476,425 | 10/1984 | Chernotsky et al. | 320/39 |
| 4,510,431 | 4/1985 | Winkler | 320/39 X |
| 4,621,225 | 11/1986 | Birk | 320/21 |
| 4,656,411 | 4/1987 | Carlson | 320/21 X |
| 4,774,449 | 9/1988 | Elkins | 320/21 |

*Primary Examiner*—Kristine L. Peckman
*Attorney, Agent, or Firm*—Jacobson, Price, Holman & Stern

[57] ABSTRACT

A battery charging device capable of charging any variety of rechargeable batteries and capable of being powered by either a 110 volt or a 220 volt A.C. power source. The battery charging device comprises an integrator circuit having a D.C. power source; a voltage comparator; a solid state relay; a D.C. output circuit; a positive voltage feedback circuit; and a negative voltage feedback circuit. The integrator circuit receives A.C. power from an A.C. power source and provides an output to the voltage comparator. The voltage comparator, in turn, is connected so as to provide an output to the solid state relay. The solid state relay preferably includes a zero voltage closing circuit and provides an output to the D.C. output circuit. The D.C. output circuit is connected to a battery-to-be-charged and provides an output D.C. voltage thereto. The D.C. output circuit is also connected to and provides outputs to the negative and positive feedback circuits which, in turn, provide feedback to the voltage comparator. Preferably, optical coupling devices connect the output from the voltage comparator to the solid state relay, as well as the positive and negative feedback circuits to the voltage comparator.

9 Claims, 5 Drawing Sheets

BATTERY CHARGER DEVICE

BACKGROUND OF THE INVENTION

The present invention relates to a battery charger and relates more particularly to a new battery charger device which utilizes the power supply principle and battery charging elements of the "Direct Current Power Supply Device," of U.S. patent application Ser. No. 08/128,221, filed Sep. 29, 1993. The present invention is applicable for use with either 110 V or 220 V to effectively charge any of a variety of rechargeable batteries.

The earliest D.C. (Direct Current) power supply in use is constructed using the secondary coil of a power transformer together with a full wave rectifier in connection with a voltage regulator device. Because this type of power supply tends to be heavy and bulky, it has been increasingly replaced by a high-frequency switch type of power supply. Recently, however, it has been discovered that the aforesaid switch type of power supply has defects such as serious high-frequency interference and high cost, etc. Heretofore, this problem remains as an outstanding issue without solution. In view of this, the inventor has devoted himself to developing a new battery charger device based on his research and experimentation over the years, and the present invention has been proved with success at overcoming the aforesaid problems respectively found in the two types of devices noted above. Thus, the present invention may have a significant impact on the way D.C. power supplies are used and might as well be regarded as a major advancement over the prior art.

SUMMARY OF THE INVENTION

In conventional D.C. power supplies, the circuitry must contain a transformer, irrespective of whether LF (low frequency) or HF (high-frequency), or an inductor coil or choke coil. This invention advantageously requires no such coil so that the overall weight of the present invention is reduced, along with production cost, while increasing the production speed. At the same time, this invention includes special technology that ensures a power output with substantially pure D.C. output characteristics which, in turn, is unique around the world. This invention includes a positive voltage feedback circuit and a negative voltage feedback circuit which are fully accomplished using a photo coupler. The solid state relay used in this invention relates to the "New Double Solid State Relay," of U.S. Pat. No 5,216,303, while the A.C. (Alternating Current) power integrator circuit in this invention relates to a part of the "New Computer Controller," disclosed in U.S. Pat. No. 5,329,193 by the present inventor.

DETAILED DESCRIPTION OF THE PREFERRED EMBODIMENT

Figure 1:
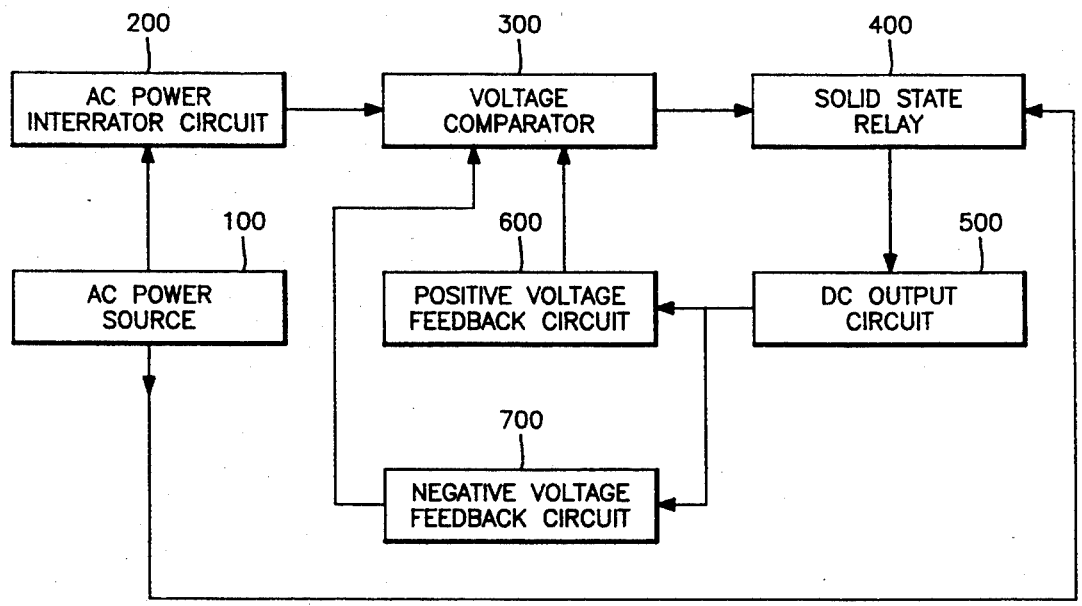
FIG. 1 is a block diagram of the new battery charger device of this invention.

Referring to FIG. 1, A.C. power source 100 provides power to an integrator circuit 200 and a solid state relay circuit 400. A triangular wave produced by the integrator circuit 200 is transmitted to a voltage comparator 300 for a comparison with D.C. power from the other input end on the voltage comparator 300 so as to form a square wave output on the output end of the voltage comparator 300. The square wave is then transmitted to an input end of the solid state relay circuit 400 so as to form a full wave output voltage at some angle with respect to the original sine wave. The voltage is then transmitted to the D.C. output circuit 500 to form a D.C. voltage output by means of filtering via the circuit 500. To ensure that the D.C. output voltage becomes steady, the input end of both a positive voltage feedback circuit 600 and a negative voltage feedback circuit incorporated by the invention is connected to the D.C. output circuit 500. The output end of each feedback circuit 600 and 700 is then connected to the voltage comparator 300, whereby the output pulse from the voltage comparator 300 may receive a proper width control.

Figure 2:
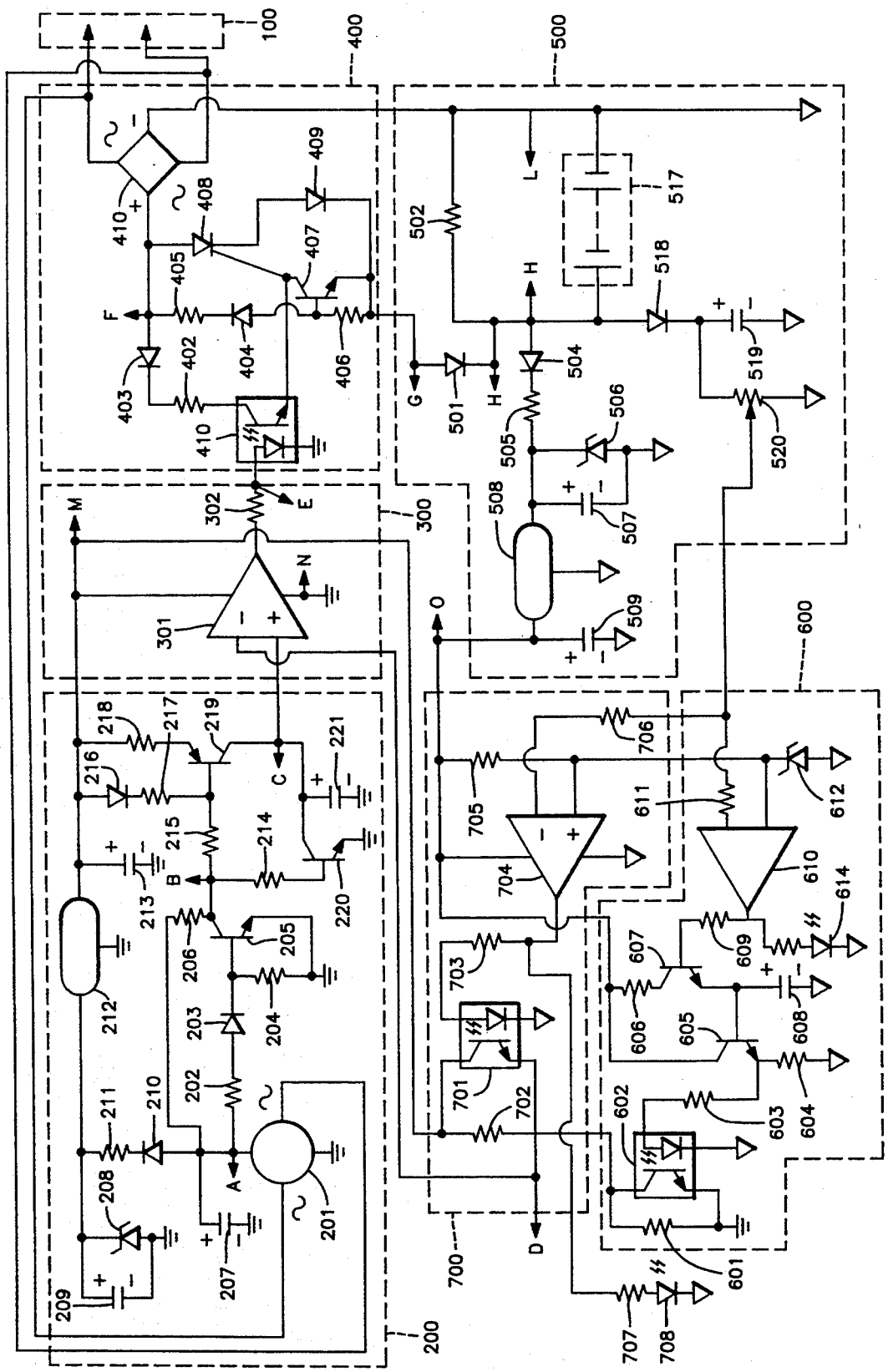
FIG. 2 is a circuit diagram of the new battery charger device of this invention.
Figure 3A:
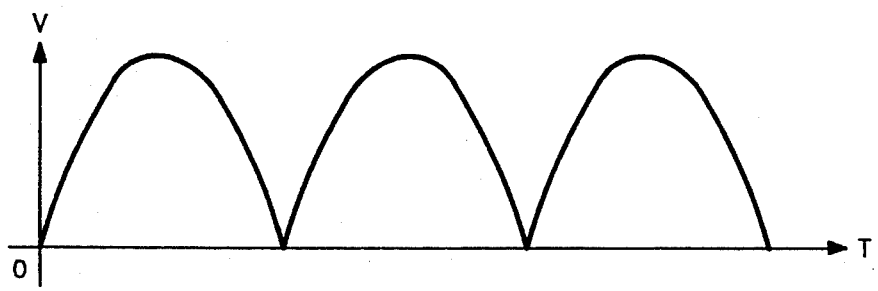
FIGS. 3-A to 3-H graphically illustrate the waveforms at respective circuit points of the new battery charger device of this invention.
Figure 3B:
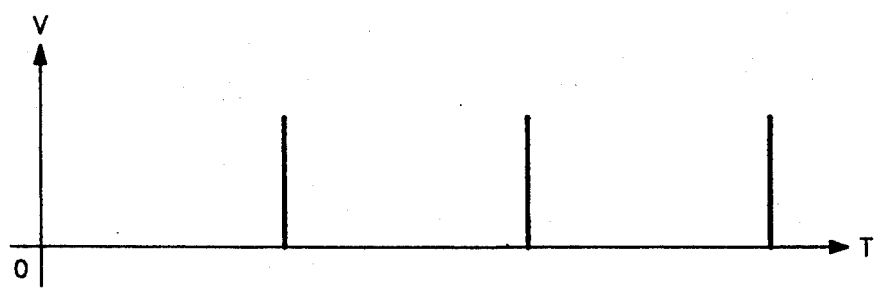
Figure 3C:
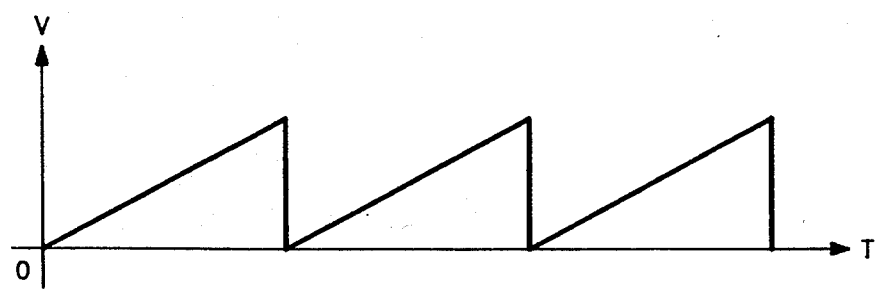
Figure 3D:
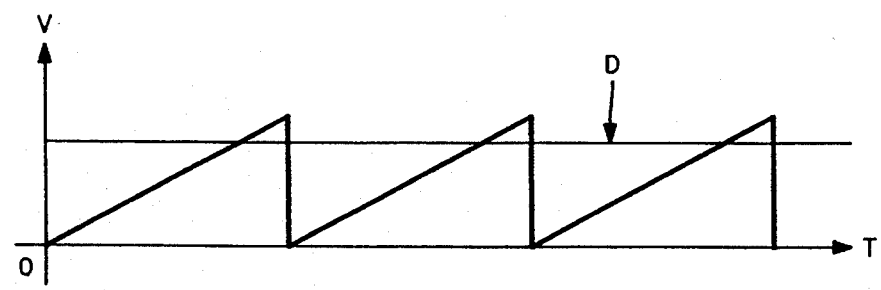
Figure 3E:
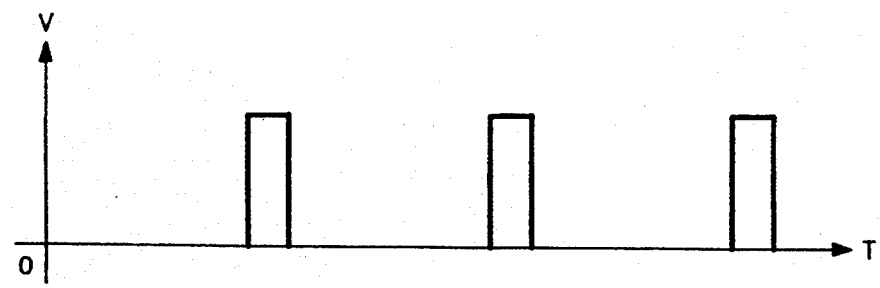
Figure 3F:
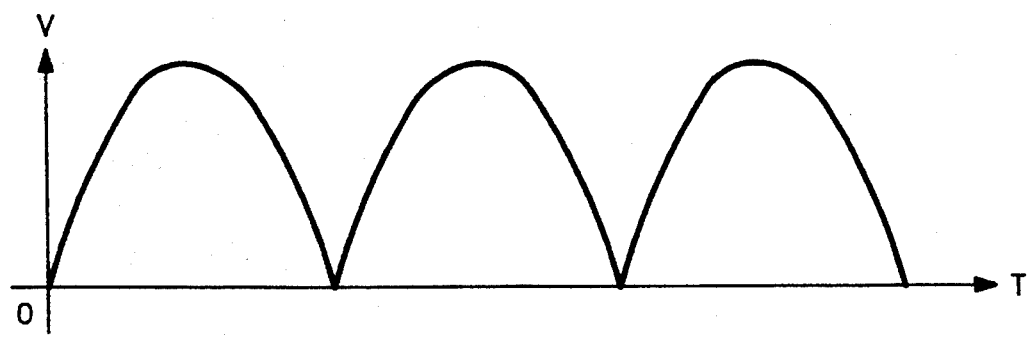
Figure 3G:
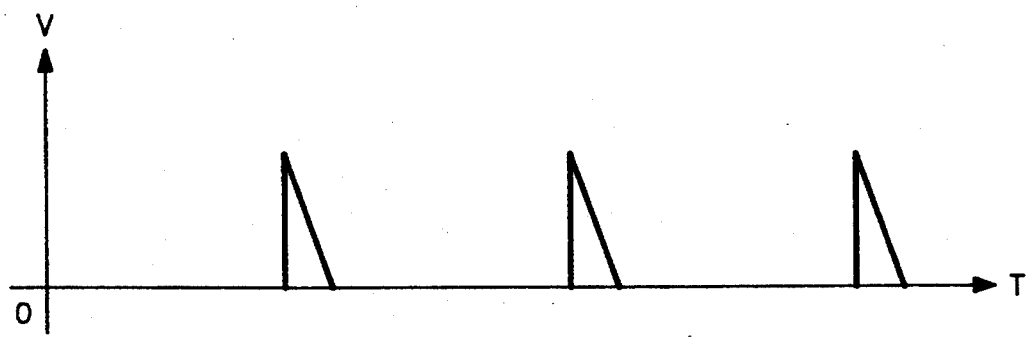
Figure 3H:
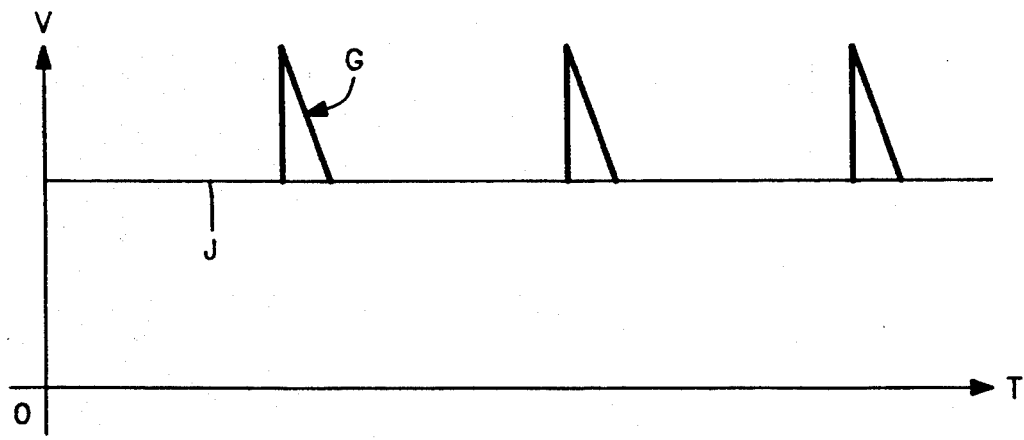

Referring to FIG. 2, when a voltage from the A.C. power source 100 is applied to the full wave rectifier bridge 201, an output waveform appears at node A. The output waveform is shown in FIG. 3-A. A positive output terminal of the full wave rectifier bridge 201 is connected to a diode 210 such that the output waveform of FIG. 3-A is transmitted to the diode 210 and through the voltage drop resistor 211, a zener diode 208, a filter capacitor 209 connected in parallel with the zener diode 208, and an input end of the 3-terminal regulators 212. The 3-terminal regulators 212 have an output end M which provides a D.C. voltage output in connection with a filter capacitor 213 to provide a D.C. power source to the voltage comparator 300, integrator circuit 200, positive voltage feedback circuit 600, negative voltage feedback circuit 700 and a first soft starter 800. The output waveform of FIG. 3-A is also transmitted to a filter capacitor 207, voltage drop resistor 202, unilateral guiding diode 203 and a base terminal of NPN transistor 205. The transistor 205 has a resistor 204 connected between its base and emitter terminals. Connected to the collector terminal of the transistor 205 is a collector resistor 206. The output waveform which appears at node B (the collector terminal of the transistor 205) is shown in FIG. 3-B. When one of the impulses shown on FIG. 3-B occurs, voltage is transmitted to the base of the transistor 220 through the current limiting resistor 214, whereby the collector and emitter of the transistor 220 are made conductive. When this occurs, a charge capacitor 221 connected in parallel with the collector and emitter of the transistor 220 discharges instantly. When there is no impulse at node B, voltage is applied through the current limiting resistor 215 to cause a constant current circuit to become conductive, whereby D.C. current from the output end M will be made to pass through the current limiting resistor 218, and the emitter and collector of the PNP transistor 219 to thereby charge the charge capacitor 221. The D.C. current will also be transmitted to the base of the transistor 219 by virtue of the diode 216 and resistor 217 to offer a fixed bias thereon so as to form a constant current charge against the charge capacitor 221. By providing this arrangement, a linear triangular wave is obtained. The voltage of the triangular wave appears at node C of the charge capacitor 221. The triangular waveform is shown in FIG. 3-C. The triangular wave voltage from node C is transmitted to the positive (noninverter) terminal of a voltage comparator IC 301 in the voltage comparator 300. The negative (inverter) terminal of the voltage comparator IC 301 is connected to the negative voltage feedback circuit 700.

The negative (inverter) terminal of the voltage comparator IC 301 is defined as node D and receives a D.C. voltage input. The voltage comparator IC 301 further comprises an output terminal which is defined as node E. The output terminal of the voltage comparator IC 301 provides a pulse output, as shown in FIG. 3-E, due to the inter-relationship between the waveform illustrated in FIG. 3-D. The pulse output voltage at node E is transmitted to an input terminal of a photo coupler 401 through the current limiting resistor 302.

Each A.C. terminal of the full wave rectifier 410 is connected to the A.C. power source 100 such that the waveform illustrated in FIG. 3-F appears at node F via the D.C. positive terminal of the full wave rectifier 410. Because the voltage comparator IC 301 provides a pulse output through its output terminal, an output voltage having the waveform illustrated in FIG. 3-G is obtained at node G via the diode 409 of the solid state relay circuit 400 of this invention.

Node H is connected to a filter capacitor 519 through a diode 518 so as to provide a D.C. voltage to the variable resistor 520, whereby the predetermined standard battery charging voltage is obtained from the middle terminal of the variable resistor 520, and the standard battery charging voltage is set subject to the characteristics of the battery.

Referring to FIG. 2, the node G voltage is obtained from the turn on voltage of the sine wave of the power source and current, therefore, flows through the diode 501 to charge the positive terminal of the battery 517 via the node H. The node L is connected to the negative terminal of the battery. The battery can be any of a variety of rechargeable batteries including hydro-nickel batteries, nickel-chrome batteries, lead storage batteries, etc. The voltage which appears across the nodes H and L has the waveform illustrated in FIG. 3-H. As shown, the G portion of the voltage is a turn on voltage, while the J portion of the voltage is the charged battery voltage. The charging operation occurs only when the G portion of the voltage surpasses the J portion of the voltage. The optimum charging voltage is determined subject to data specified by the battery supplier.

In order to ensure a satisfactory charging effect, this invention provides a charging indicator. In particular, a current limiting resistor 707 and a LED 708 are connected to the output terminal of a voltage comparator IC 704 of the negative voltage feedback circuit 700. When the LED 708 is not activated, this indicates that the voltage of the battery 517 is still below the preset voltage (which is the same as the voltage across a zener diode 612 in the positive voltage feedback circuit 600) and that the battery 517 is being charged. When the LED 708 flashes, it means that the battery 517 is almost charged to the saturation state. When the LED 708 remains constantly on, it means that the battery 517 has been fully charged to the saturation state. At the same time, the output voltage at node G becomes zero. The voltage setting on the zener diode 612 is determined subject to the saturation (or fully charged) voltage of the battery 517.

If the battery to be charged is connected to the terminal points H and L of this invention while the A.C. power source is disconnected, this invention automatically detects the voltage of the battery. If the LED 708 is turned on constantly, it means that the battery 517 has been fully charged, and therefore no further charging is needed. Similarly, a current limiting resistor 613 and a LED 614 may be connected to the output terminal of a voltage comparator 610 in the positive voltage feedback circuit 600. The LED 614 therefore operates oppositely with respect to the LED 708.

Figure 5:
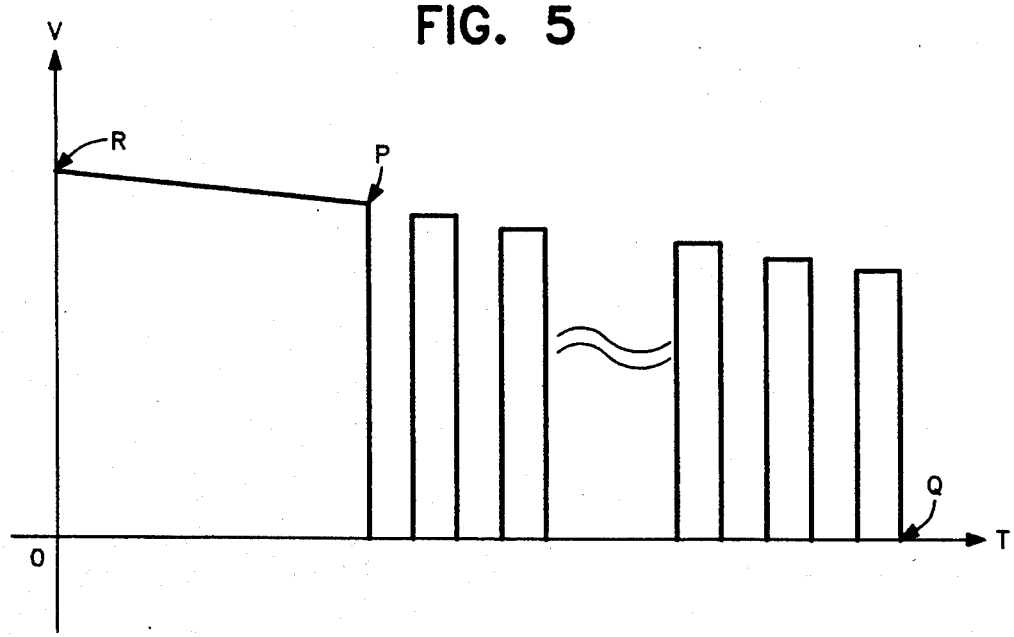
FIG. 5 graphically illustrates a charging curve according to this invention.

Referring to FIG. 5, there is shown a charger current curve according to the present invention. Now turning to FIG. 4, a positive terminal of a bridge rectifier 415' is connected to node G and also to a D.C. Ammeter 416'. The charger current curve is obtained from the D.C. Ammeter 416'. When the battery 517 is initially charged, the charging current value is at a maximum level, as shown by point R in FIG. 5. The charging current is gradually reduced to the point P on FIG. 5 a certain period after the start of charging. The point P indicates that the battery voltage has come closer to the saturation state. At this time, the present invention switches to an intermittent charging mode, which is indicated by the flashing of the LED 708 and the LED 614. The charging interval during the intermittent charging mode is determined subject to the characteristics of the battery. This intermittent charging method keeps the battery at the saturated standby status for a long time. The point Q as shown on FIG. 5 represents completion of the charging operation of this invention. At this point, the charging current is zero. If a battery is not used for a long time, its voltage will drop, and its stored energy will disappear gradually. This problem is eliminated by the intermittent charging operation of this invention. This invention automatically charges the battery from the point P to the point Q as shown in FIG. 5.

Figure 4:
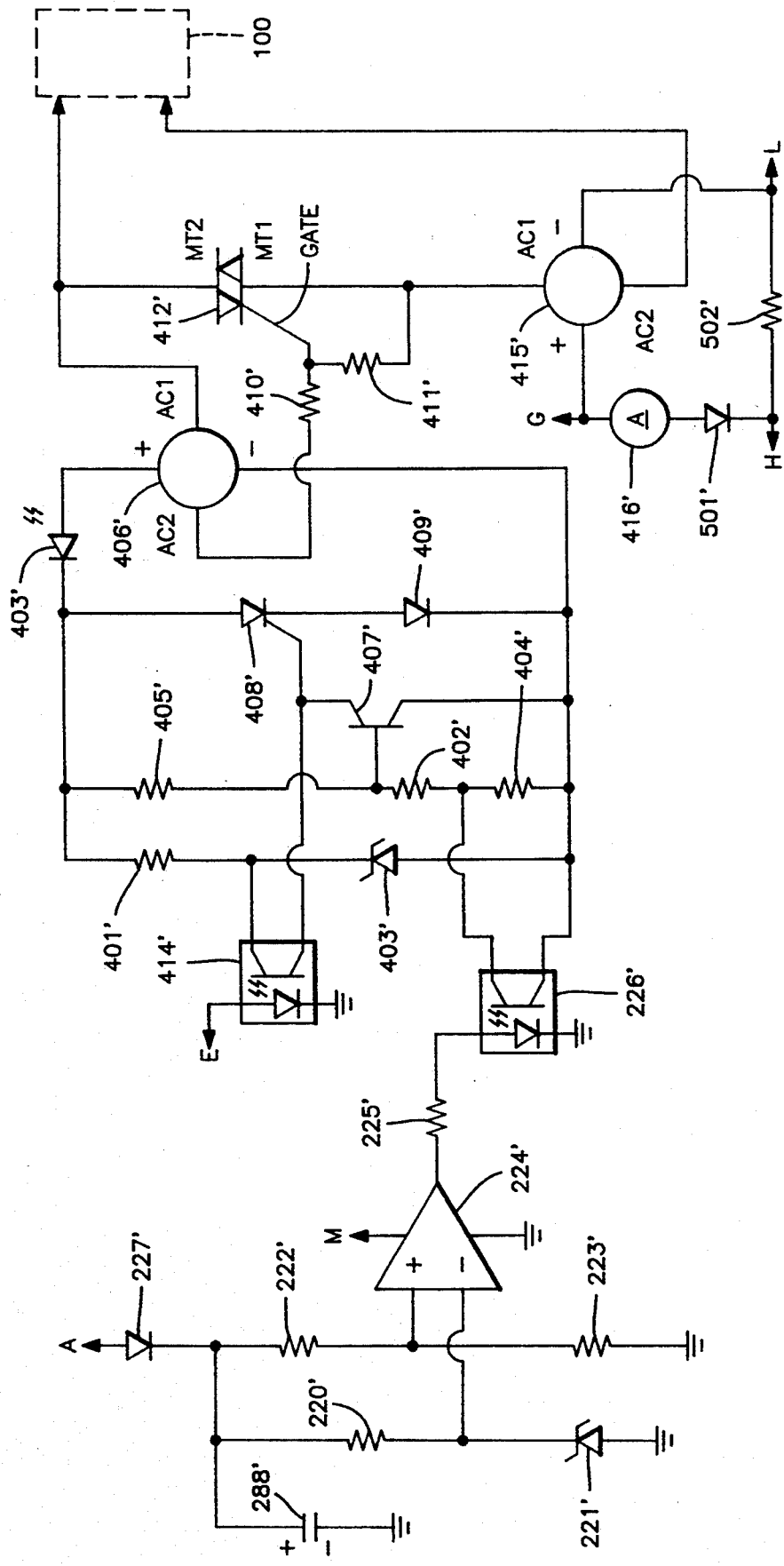
FIG. 4 is a circuit diagram of the solid state relay according to this invention.

The solid state relay circuit 400 is used so that A.C. power source 100 can use A.C. 110 V or A.C. 220 V alternatively. The solid state relay circuit 400, as shown in FIG. 4, has been patented in the United States under U.S. Pat. No. 5,216,300.

The A.C. power source 100 is connected to the MT2 terminal of the A.C. Thyristor 412' and the AC1 terminal of the bridge rectifier 406'. At the same time, the positive terminal of the bridge rectifier 406' provides a D.C. output to the P-junction of the LED 403'. The N-junction of the LED 403' is connected to the anode of the SCR (silicon-controlled rectifier) 408', the drop voltage resistor 401' and one end of the resistor 405' of the zero voltage closing circuit. A D.C. voltage is applied through the resistor 405' of the zero voltage closing circuit. The resistor 405' is connected in series with resistors 402' and 404'. The connection between the resistors 405' and 402' is electrically connected to the base terminal of a transistor 407' in the zero voltage closing circuit. The collector terminal of the transistor 407' is connected to the gate terminal of an SCR 408' and the emitter terminal of a photo coupler 414'. The emitter of the transistor 407' is connected to the resistor 404', the emitter of a photo coupler 226', and the N-junction of a diode 409'. The emitter of the transistor 407' is further connected to the negative terminal of the bridge rectifier 406'.

The node located at the series interconnection between the resistors 402', 404' is connected to the collector terminal of the photo coupler 226'. An opposite terminal of the drop voltage resistor 401' with respect to the diode 403' is connected to a zener diode 413' and the collector terminal of the photo coupler 414'. The cathode of the SCR 408' is connected to the P-junction of the diode 409'.

The AC2 terminal of the bridge rectifier 406' is connected to the gate of the A.C. thyristor 412' through a current limiting resistor 410'. A resistor 411' is connected between the gate and the MT1 terminals of the thyristor 412'. The voltage between the gate and the MT2 terminal is obtained from opposite ends of the resistor 411'.

The MT1 terminal of the thyristor 412' is connected to the AC1 terminal of the bridge rectifier 415'. The AC2 terminal of the bridge rectifier 415' is connected to the A.C. power source 100, while the positive terminal of the bridge rectifier 415' is connected to the node G. The waveform which appears at the node G is shown in FIG. 3-G. The negative terminal of the bridge rectifier 415' is connected to the node L.

The positive terminal of a voltage comparator circuit 224' is connected to an interconnection between a pair of series-connected shunt resistors 222', 223'. An opposite end of the resistor 222' is connected to the N-junction of a diode 227', while an opposite end of the resistor 223' is connected to ground.

The negative terminal of the voltage comparator circuit 224' is connected to an interconnection between a resistor 220' and a zener diode 221'. One end of the resistor 220' controls the N-junction of the diode 227'. The P-junction of the zener diode 221' is connected to ground.

The output terminal of the voltage comparator circuit 224' is connected to a current limiting resistor 225'.

The current limiting resistor 225' has one end connected to the P-junction of the LED of the photo coupler 226'. The N-junction of the LED of the photo coupler 226' is connected to ground.

The N-junction of the diode 227' is connected to a capacitor 228', while the P-junction of the diode 227' is connected to the node A.

Referring to FIG. 4, if the voltage at the node A is at the preset low voltage level when the photo coupler 414' is turned to the conductive status, the voltage at the zener diode 221' becomes higher than the voltage at the interconnection between the resistors 222', 223'. Consequently, the output of the voltage comparator circuit 224' becomes zero, and the base voltage of the transistor 407' of the zero voltage closing circuit equals the sum of the two voltage drops across the resistors 402', 404'. On the contrary, if the voltage at the node A corresponds to the preset high voltage level, the voltage across the zener diode 221' becomes lower than that of the interconnection between the resistors 222', 223'. Consequently, the voltage comparator circuit 224' provides a voltage output to the photo coupler 226' causing the output terminal of the photo coupler 226' to be rendered conductive. As a result, the base voltage of the transistor 407' of the zero voltage closing circuit is the saturation voltage of the output end of the resistor 402' and photo coupler 226'. As indicated, the preset low voltage and high voltage of the node A can be used to change the operation voltage of the transistor 407' of the zero voltage closing circuit, so as to control the operation voltage of the zero voltage closing circuit. The current passing through the current limiting resistor 405' may also be controlled by a photo coupler. A solid state relay or photo thyristor may be used to replace the photo coupler 226'.

What is claimed is:

1. A battery charger device for connection to an A.C. power source comprising, an integrator circuit having a D.C. power source, a voltage comparator having at least a first and a second input terminal and an output terminal, a solid state relay circuit, a D.C. output circuit, a positive voltage feedback circuit, and a negative voltage feedback circuit;

said integrator circuit having a full wave rectifier for rectifying A.C. power from said A.C. power source, said integrator circuit processing said A.C. power to form an impulse wave from said A.C. power which is further processed by said integrator circuit to form a synchronous triangular wave which is directly transmitted to said first input terminal of the voltage comparator;

said voltage comparator being responsive to said triangular wave transmitted by said integrator circuit and being further responsive to a D.C. voltage output from said negative voltage feedback circuit and transmitted to said second input terminal so as to provide a synchronous square wave output at said output terminal, said square wave having a temporal width which is changed subject to the magnitude of said D.C. voltage on said second input terminal, and said D.C. voltage magnitude being subject to change in the same manner as determined by said positive voltage feedback circuit, said square wave output from said voltage comparator being directly coupled with a photo coupler of said solid state relay circuit;

said solid state relay circuit comprising, a second full wave rectifier for rectifying said A.C. power for the performance of synchronous conduction with said synchronous square wave to thereby provide a synchronous conduction voltage which is then transmitted to said D.C. output circuit by means of direct coupling;

said D.C. output circuit filtering said synchronous conduction voltage from said solid state relay circuit so as to provide a second D.C. voltage, and a voltage containing a certain angle of sine wave function hence formed on an output terminal of said D.C. output circuit by using a voltage regulation method, said output terminal of said D.C. output circuit defining a sampling voltage point which is connected to an input terminal of said positive voltage feedback circuit and negative voltage feedback circuit said D.C. output circuit being coupled to said positive voltage feedback circuit and negative voltage feedback circuit;

said positive voltage feedback circuit, sampling said voltage at the sampling voltage point of the D.C. output circuit formed as a basis for advancing said D.C. voltage output to the second input terminal of the voltage comparator, said positive voltage feedback circuit having a photo coupling means between an output terminal of said positive voltage feedback circuit and said voltage comparator;

said negative voltage feedback circuit, sampling said voltage at the sampling voltage point of the D.C. output circuit formed as a basis for reducing said D.C. voltage output to the second input terminal of the voltage comparator, said negative voltage feedback circuit having a photo coupling means between an output terminal of said negative voltage feedback circuit and said voltage comparator.

2. The battery charger device of claim 1 wherein said negative voltage feedback circuit comprises a light emitting diode, which is in one of the following states: off when a battery being charged is below a preset voltage, flashes when the voltage of said battery being charged is close to a saturation voltage level and remains on constantly when the battery being charged is fully charged; and wherein said positive voltage feedback circuit comprises a light emitting diode, which is operated reversely with respect to the light emitting diode of said negative voltage feedback circuit.

3. The battery charger device of claim 1 further comprising a sampling voltage output terminal coupled to said positive voltage feedback circuit and negative voltage feedback circuit to detect a charging voltage from said D.C. output circuit.

4. The battery charger device of claim 1, wherein said positive voltage feedback circuit operates such that, when the voltage at the sampling voltage point is less than a preset value for said positive voltage feedback circuit, the positive voltage feedback circuit causes an increase in the temporal width of the synchronous square wave from said voltage comparator so as to advance said second D.C. voltage, and wherein said positive voltage feedback circuit comprises a voltage comparator circuit, a time delay circuit and a photo coupler circuit directly coupled to one another; said voltage comparator circuit comprising a common voltage comparator IC; said time delay circuit comprising a current limiting resistor, a transistor, a collector resistor, an emitter capacitor and an emitter follower, a delay time of said time delay circuit being determined subject to the resistance of the collector resistor and the capacitance of the emitter capacitor; said photo coupler circuit comprising a photo coupler IC having an input terminal connected to an emitter resistor of the emitter follower of the time delay circuit, and an output terminal having a resistor connected in parallel therewith, one end of the parallel-connected resistor being connected to an input power terminal of said voltage comparator and another end of said parallel-connected resistor being a common grounding end.

5. The battery charger device of claim 1, wherein said negative voltage feedback circuit operates such that, when the voltage at the sampling voltage point is more than a preset value for said negative voltage feedback circuit, the negative voltage feedback circuit causes a reduction in the temporal width of the synchronous square wave from said voltage comparator so as to lower said second D.C. voltage, and wherein said negative voltage feedback circuit comprises a voltage comparator circuit and a photo coupler circuit connected directly thereto; said voltage comparator circuit comprising a common voltage comparator IC; said photo coupler comprising a photo coupler IC having an input terminal connected to an output terminal of said voltage comparator IC by means of direct coupling, and an output terminal having a parallel connected resistor, one end of said parallel connected resistor being connected to said D.C. power source and another end of said parallel connected resistor being connected to the second input terminal of said voltage comparator.

6. The battery charger device of claim 1 wherein the battery to be charged can be one of a hydro-nickel battery, nickel-chrome battery, lead storage battery.

7. The battery charger device of claim 1, wherein said solid state relay circuit comprises a zero voltage closing circuit having a plurality of resistors and transistors, one of said resistors being connected in parallel to the output terminal of a photo coupler device, the impedance of said output terminal of the photo coupler device being changed by switching an output terminal of the photo coupler device between ON and OFF so as to control an A.C. thyristor in turning on an A.C. power source voltage as the transistors are off; the resistors of said zero voltage closing circuit being connected in series, the photo coupler device being replaceable by one of a relay and a photo thyristor.

8. The battery charger device of claim 1 wherein said battery charger device operates in a charging status when the sine wave function voltage of the A.C. power is higher than the voltage of a battery being charged; and operates in a non-charging status when the sine wave function voltage of the A.C. power is lower than the voltage of the battery being charged.

9. The battery charger device of claim 1, wherein said battery charger device operates such that when a battery is initially charged, the battery charger device provides a charging current having a maximum magnitude, the charging current being gradually reduced after charging commences, and wherein the D.C. output circuit charges the battery intermittently when the voltage of the battery is close to a saturation state, said charging current becoming zero when charging is finished, and wherein the D.C. output circuit automatically charges the battery when the voltage of the battery drops to a predetermined level so that the battery is constantly maintained at the saturation voltage.

* * * * *